United States Patent [19]

Hallgren et al.

[11] Patent Number: 4,634,755
[45] Date of Patent: Jan. 6, 1987

[54] METHOD FOR MAKING NORBORNANE ANHYDRIDE SUBSTITUTED POLYORGANOSILOXANE

[75] Inventors: John E. Hallgren, Scotia; Diane V. Brezniak, Clifton Park, both of N.Y.

[73] Assignee: General Electric Company, Schenectady, N.Y.

[21] Appl. No.: 835,491

[22] Filed: Mar. 3, 1986

[51] Int. Cl.$^4$ .............................................. C08G 77/06
[52] U.S. Cl. ......................................... 528/23; 528/26; 528/37; 549/234; 549/235; 549/236; 549/237
[58] Field of Search ............................. 528/37, 23, 26; 549/234, 235, 236, 237

[56] References Cited

U.S. PATENT DOCUMENTS 4,381,396  4/1983  Ryang ................................. 549/236
4,598,135  7/1986  Buese ................................. 549/234

Primary Examiner—Melvyn I. Marquis
Attorney, Agent, or Firm—William A. Teoli; James C. Davis, Jr.; James Magee, Jr.

[57] ABSTRACT

A method is provided for making norbornane anhydride substituted organosiloxane by equilibrating norbornane anhydride organosiloxane with cyclopolydiorganosiloxane, organopolysiloxane and mixtures thereof under neat conditions in the presence of an acidic equilibration catalyst followed by quenching the resulting mixture with a silazane and thereafter devolatilizing the resulting equilibrated product.

6 Claims, No Drawings

METHOD FOR MAKING NORBORNANE ANHYDRIDE SUBSTITUTED POLYORGANOSILOXANE

BACKGROUND OF THE INVENTION

Prior to the present invention, as shown by Ryang, for Silylnorbornane Anhydrides and Methods for Making, U.S. Pat. No. 4,381,396, assigned to the same assignee as the present invention and incorporated herein by reference, silylnorbornane anhydrides were made by effecting reaction between 5-norbornene-2,3-carboxylic anhydride and a silicon hydride in the presence of a platinum catalyst. As taught by Ryang, anhydride terminated polydiorganosiloxane was made by equilibrating the 1,3-bis(norbornane-dicarboxylic anhydride)tetraorganodisiloxane with cyclopolydiorganosiloxane in the presence of an organic solvent such as toluene and an equilibration catalyst such as sulfuric acid. Although valuable results have been achieved by Ryang in accordance with the aforementioned equilibration procedure, experience has shown that when equilibration is conducted in the presence of an organic solvent, a significant amount of cyclopolydiorganosiloxane is generated, which can be up to 99% by weight of the initial diorganosiloxane utilized mixture. It would be desirable to make norbornane anhydride substituted organosiloxane utilizing norbornane-dicarboxylic anhydride siloxane along with cyclopolydiorganosiloxane or organo terminated polydiorganosiloxane or mixtures thereof to produce norbornane anhydride substituted organosiloxane without the generation of a significant amount of cyclopolydiorganosiloxane.

As taught in copending application Ser. No. 793,360, filed Oct. 31, 1985, for Buese, now U.S. Pat. No. 4,598,135 assigned to the same assignee as the present invention and incorporated herein by reference, improved equilibration results can be achieved by conducting the equilibration of norbornane anhydride substituted organosiloxane with cyclopolydiorganosiloxane or organo terminated polydiorganosiloxane or mixtures thereof under neat conditions in the presence of an equilibration catalyst, such as trifluoromethane sulfonic acid. Although improved results are obtained with respect to a substantial reduction in the formation of cyclopolydiorganosiloxane in the recovery of improved yields of norbornane anhydride substituted organosiloxane, the resulting equilibration mixture has to be quenched with a quenching agent, such as magnesium oxide, which must be filtered from the equilibration mixture.

It would be desirable to achieve improved equilibration results with respect to the generation of norbornane anhydride substituted organosiloxane, while eliminating the need for a quenching agent requiring a separate filtration step to remove the quenching agent from the mixture.

The present invention is based on our discovery that certain organosilazanes as defined hereinafter have been found useful as quenching agents for acidic norbornane anhydride organosiloxane equilibration catalysts. In addition, it has been found that such organosilazanes can be readily stripped from the equilibration mixture during the devolitization step after equilibration has been achieved.

STATEMENT OF THE INVENTION

There is provide by the present invention a method which comprises, (1) equilibrating under neat conditions, a mixture comprising a norbornane anhydride organosiloxane and cyclopolydiorganosiloxane in the presence of an acidic equilibration catalyst, (2) quenching the resulting mixture of (1) with an organosilazane, utilizing at least two moles of organosilazane, per mole of acidic equilibration catalyst and (3) heating the resulting mixture of (2) under reduced pressure to effect the removal of volatiles.

Some of the norbornane dicarboxylic acid anhydride organosiloxanes which can be used in the practice of the present invention are shown by the following formulas,

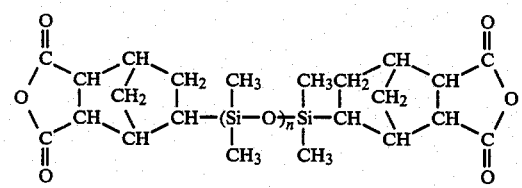
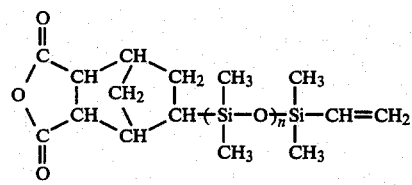
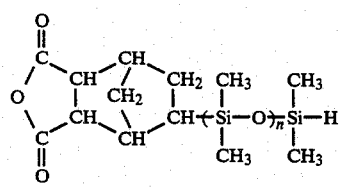
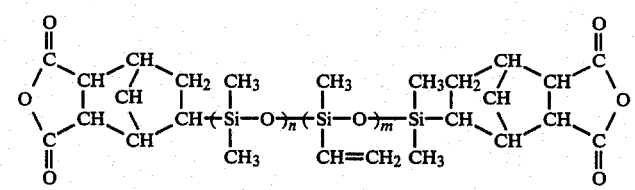

where n and m are equal to 1 to 10, inclusive.

Among the organosiloxane which can be utilized in the practice of the present invention are cyclopolydiorganosiloxane, such as

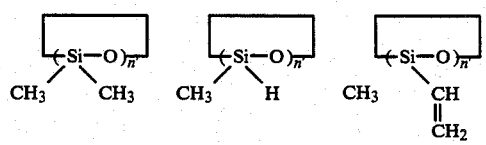

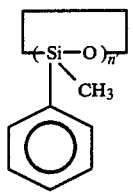

where n' is equal to 3 to 12 inclusive.

In addition to the above cyclopolydiorganosiloxane, there also can be utilized linear or branched organosiloxane such as

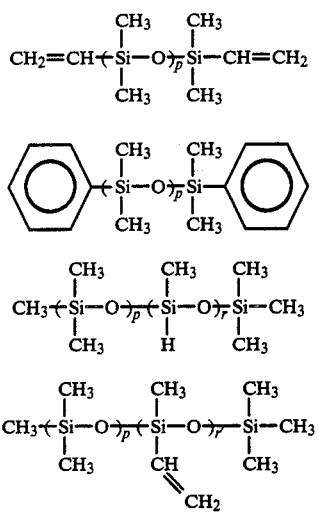

where p is equal to 1 to 1000 inclusive, and r and r' are equal to 1 to 50 inclusive.

Some of the organosilazanes which can be used in the practice of the invention are shown by Martellock, U.S. Pat. No. 3,243,404, assigned to the same assignee as the present invention and incorporated herein by reference.

Additional silazanes which can be used are shown by Rochow, Chemistry of the Silicones, 2nd Edition (1951) John Wiley & Sons, New York, p. 186, which also is incorporated herein by reference. The preferred organosilazane is hexamethyldisilazane.

Acidic equilibration catalysts can be used at from 0.15% to 2% by weight of catalyst based on the weight of equilibration reaction mixture. Some of the equilibration catalysts which can be used are, for example, trifluoromethane sulfonic acid, sulfuric acid, etc.

In the practice of the present invention, a mixture of norbornane anhydride organosiloxane, cyclopolydiorganosiloxane, or organosiloxane end stopped polyorganosiloxane, or a mixture of such organosiloxanes, is heated at a temperature in the range of from 120° to 160° C. under neat conditions, while in the presence of an effective amount of equilibration catalyst. Depending upon the molecular weight of the norbornane anhydride organosiloxane desired, the proportions of norbornane anhydride and organosiloxane, which can include cyclopolydiorganosiloxane and end stopped polydiorganosiloxane can vary widely. In particular instances, polydiorganosiloxane, having chemically combined organosiloxy norbornane anhydride units, can be employed to produce polydiorganosiloxane having chemically combined norbornane anhydride terminal groups, and chemically combined norbornane anhydride siloxy units in the backbone of the polydiorganosiloxane.

At the termination of the equilibration reaction which can last about 5 to 10 hours at about 120° C. to 180° C. with stirring, the equilibration mixture is allowed to cool to ambient temperatures. There is then added an effective amount of organosilazane quencher to the equilibration mixture. An effective amount of organosilazane is 2 to 10 moles of organosilazane and preferably 2 to 5 moles, per mole of acidic catalyst.

The quenched mixture is then devolatilized or distilled at a temperature of 25° to 250° C. at a pressure of 0.002 torr to 0.01 torr.

The silylnorbornane anhydride terminated organosiloxane of the present invention can be utilized in making silicone polyimide block polymers useful as silicone elastomeric adhesives or as epoxy resin curing agents.

In order that those skilled in the art will be better able to practice the present invention, the following example is given by way of illustration and not by way of limitation. All parts are by weight.

EXAMPLE 1

There was added under nitrogen 1730.0 grams (5.832 moles) of octamethylcyclotetrasiloxane which had been previously dried over calcium hydride to 270 grams (0.583 mole) of 5,5'-(1,1,3,3-tetramethyl-1,3-disiloxanediyl)bis-norbornane-2,3-dicarboxylic anhydride which had been heated until melting occurred at 120°-140° C. and degassed in vacuo until bubbling ceased. Two milliliters (0.025 mole) of trifluoromethane sulfonic acid was then added and the mixture was stirred and heated to 160° C. for several hours during which time the mixture became homogeneous. The reaction mixture was cooled to room temperature. An aliquot of the reaction mixture was removed and quenched with hexamethyldisilazane at room temperature in a calculated 2:1 molar ratio of hexamethyldisiloxane to trifluoromethane sulfonic acid. Quenching was observed to be complete in about 15 minutes by a GC analysis method. The mixture was then distilled at reduced pressure to ensure removal of the quenching by-products and any cyclodiorganosiloxanes that had formed. GC analysis following vacuum distillation showed that the polymers were stable. Based on method of preparation, there was obtained a 88% yield of norbornane anhydride-terminated polydimethylsiloxane having the average formula

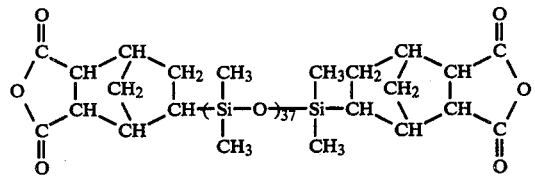

The above procedure was repeated except additional ratios of moles of hexamethyldisilazane per mole of trifluoromethane sulfonic acid were employed. Although GC analysis indicated prior to distillation quenching had occurred in the organopolysiloxane mixture, subsequent vacuum distillation showed that reequilibration could occurr unless at least a ratio of 2 moles of the hexamethyldisilazane, per mole of the trifluoromethane sulfonic acid was employed. Reequilibration would reduce the yield of norbornane anhydride terminated polydimethylsiloxane and increase the yield of cyclics.

Although the above example is directed to only a few of the very many variables which can be employed in the practice of the method of the present invention, it should be understood that the method of the present invention is directed to the use of a much broader variety of norbornane anhydride organosiloxane, cyclic polydiorganosiloxane, silazane and equilibration catalyst as set forth in the description preceding this example.

What I claim as new and desire to secure by Letters Patent of the United States is:

1. A method which comprises,
   (1) equilibrating under neat conditions a mixture comprising a norbornane anhydride organosiloxane and cyclopolydiorganosiloxane in the presence of an acidic equilibration catalyst,
   (2) quenching the resulting mixture of (1) with an organosilazane, utilizing at least two moles of organosilazane, per mole of acidic equilibration catalyst and
   (3) heating the resulting mixture of (2) under reduced pressure to effect the removal of volatiles.

2. A method in accordance with claim 1 where the norbornane dicarboxylic anhydride is 1,3-bis(norbornane-dicarboxylic anhydride) tetraorganodisiloxane.

3. A method in accordance with claim 1 where the organosiloxane is cyclopolydimethylsiloxane.

4. A method in accordance with claim 1 where the organosiloxane is dimethylvinyl-terminated dimethylsiloxane.

5. A method in accordance with claim 1 where the silazane is hexamethyldisilazane.

6. A method in accordance with claim 1 where the equilibration catalyst is trifluoromethane sulfonic acid.

* * * * *